April 10, 1945. H. HAIGH 2,373,558
METHOD OF MAKING ELASTIC FLUID TURBINE DIAPHRAGMS AND THE LIKE
Filed Oct. 31, 1942

Inventor:
Hezekiah Haigh,
by Harry E. Dunham
His Attorney.

Patented Apr. 10, 1945

2,373,558

UNITED STATES PATENT OFFICE 2,373,558

METHOD OF MAKING ELASTIC FLUID TURBINE DIAPHRAGMS AND THE LIKE

Hezekiah Haigh, Scotia, N. Y., assignor to General Electric Company, a corporation of New York Application October 31, 1942, Serial No. 464,115

3 Claims. (Cl. 29—156.4)

The present invention relates to elastic fluid turbine diaphragms for conducting elastic fluid to bucket wheels. More specifically the invention relates to methods of manufacturing diaphragms which have nozzle structures or bladed bodies comprising a plurality of circumferentially spaced blades or partitions having ends secured to bands with inner and outer walls conical or curved in an axial direction. Heretofore difficulties have been experienced in the manufacture of such nozzle structures.

The general object of my invention is to provide an improved method of manufacturing nozzle structures of the type aforementioned whereby such structures may be produced with great accuracy and at comparatively reasonable cost.

For a consideration of what I believe to be novel and my invention, attention is directed to the following description and the claims appended thereto in connection with the accompanying drawing.

Figure 1:
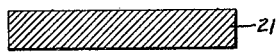
Figure 2:
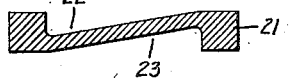
Figure 6:
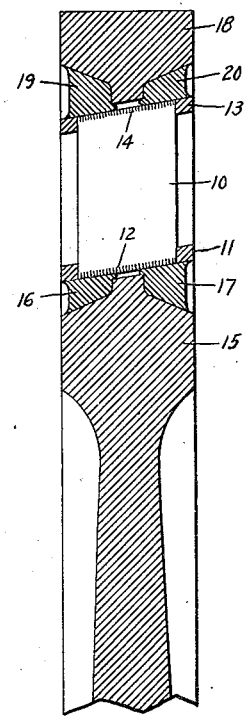
Figure 7:

In the drawing Figs. 1 to 6, inclusive, illustrate a succession of steps in the manufacture of a turbine nozzle diaphragm according to my invention; and Fig. 7 illustrates a modification of the structure shown in Fig. 2.

The diaphragm as illustrated in Fig. 6 comprises a plurality of circumferentially spaced blades or partitions 10 having inner ends secured in openings of an inner band 11 by a weld 12 and outer ends secured in openings of an outer band 13 by a weld 14. The blades 10 with the inner and outer bands 11 and 13 form a nozzle structure. The inner end of this structure is secured to a disk 15 by welds 16 and 17 on opposite sides of the disks and the outer end of the nozzle structure is secured to an outer ring 18 by similar welds 19 and 20 on opposite sides of the ring 18. In actual practice it is customary to split the diaphragm along a diameter to facilitate assembling and dismantling of the two halves in a turbine. As shown in Fig. 6 the inner and outer bands 11 and 13 to which the ends of the blades 10 are secured are essentially conically shaped in the direction of flow of fluid, each of the bands 11 and 13 forming a cone with a plurality of circumferentially spaced openings for receiving the ends of the partitions 10.

Figure 3:
Figure 4:
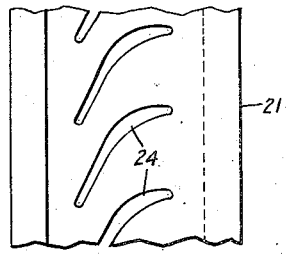
Figure 5:
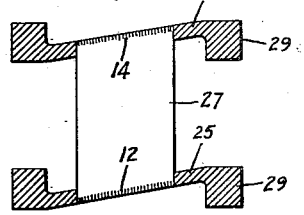

The cone shaped band in accordance with my invention is produced from a flat strip of material 21 as indicated in Fig. 1. Grooves 22 and 23 are formed in opposite sides of the strip 21 along central portions thereof as indicated in Fig. 2. The grooved strip thereupon is bent, as shown in Fig. 3, to form a ring or half of a ring with an essentially conically shaped central portion. A plurality of circumferentially uniformly spaced openings 24 (Fig. 4) are then formed in the central conically shaped portion of the ring by a punching operation. An inner punched ring 25 and an outer punched ring 26 (Fig. 5) are then assembled with a plurality of partitions 27. These partitions have thickened end portions filling the openings 24 of the rings 25, 26 and the outer and inner ends of the partitions 27 are fused to adjacent walls of the rings 25 and 26, respectively, by welds 12 and 14, thus forming a nozzle structure as shown in Fig. 5. This structure, however, is not yet completed in that it still includes the thick edge portions 29 of the original strip 21. These thickened edge portions of each ring are alike and thus can be easily held in standard fixtures during the assembly and the welding of the partitions with the rings and also during the subsequent assembly of the nozzle structure with an outer ring 18 and an inner disk 15 as shown in Fig. 6. After the assembly of the nozzle structure with the outer ring and inner disk the welds 16, 17, 19 and 20 are provided and upon completion of these welds the thickened end portions 29 are cut off and the sides of the diaphragm structure are machined in known manner to form smooth parallel surfaces.

In the above example the inner and outer bands 11 and 13 are conical with the generatrix of the cone formed by a straight line. In other instances it may be desirable to form nozzle passages with outer and inner walls formed by generatrices other than straight lines. Such a structure is indicated in Fig. 7 corresponding to Fig. 2 of the example aforementioned. In this instance a flat strip 30 is provided with opposite grooves 31 and 32 having bottoms with a curvature corresponding to the desired curvature of the nozzle passage. Otherwise the process of manufacturing the complete nozzle structure and diaphragm is essentially the same as that described above, that is, upon formation of the grooves 31 and 32 the strip is bent into a ring or half ring whereupon openings are punched into the ring for receiving ends of partitions.

While I have illustrated and described my invention in connection with turbine diaphragms, it is to be understood that the invention is not limited thereto necessarily but may be used in connection with other fluid directing members such as turbine wheels for example.

What I claim as new and desire to secure by Letters Patent of the United States is:

1. The method of manufacturing a diaphragm having a nozzle structure including inner and outer bands and circumferentially spaced partitions projecting into openings of the bands, and an outer ring secured to the outer band, and an inner disk secured to the inner band which method comprises forming a flat strip of material substantially rectangular in cross section, forming central grooves in opposite sides along the strip, bending the grooved strip into a ring with like cylindrical flanges along the edges thereof, forming circumferentially spaced openings in the grooved portion, assembling two rings with inner and outer ends of a plurality of partitions, and fusing the nozzle structure to an outer ring and an inner disk.

2. The method of producing a device of the kind described which comprises forming a flat metal strip substantially rectangular in cross section, forming a groove along the central portion of the strip, which groove has a depth gradually increasing across the strip, bending the grooved strip to form a conical segment with like cylindrical flanges integral with the edges thereof, forming a plurality of spaced openings in the central grooved portion of the bent strip, assembling a plurality of partitions with the strip while the cylindrical flanges are held in a jig, and removing said flanges.

3. The method of producing a bladed structure of the kind described comprising forming a flat strip, forming a groove along the strip, said groove having a bottom inclined across the strip, bending the strip to form a conical segment with like cylindrical flanges integral with opposite edges of the segment, punching spaced openings into the bottom of the bent strip, inserting the ends of partitions into two concentrically spaced punched strips, and cutting off edge portions of the strips.

HEZEKIAH HAIGH.